United States Patent
Shen et al.

(10) Patent No.: US 11,800,489 B2
(45) Date of Patent: Oct. 24, 2023

(54) RESOURCE MAPPING METHOD, RESOURCE DETERMINATION METHOD, NETWORK SIDE DEVICE AND USER EQUIPMENT

(71) Applicant: VIVO MOBILE COMMUNICATION CO., LTD., Chang'an Dongguan (CN)

(72) Inventors: Xiaodong Shen, Chang'an Dongguan (CN); Peng Sun, Chang'an Dongguan (CN); Xueming Pan, Chang'an Dongguan (CN); Yu Ding, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 520 days.

(21) Appl. No.: 16/757,307

(22) PCT Filed: Oct. 12, 2018

(86) PCT No.: PCT/CN2018/109976
§ 371 (c)(1),
(2) Date: Apr. 17, 2020

(87) PCT Pub. No.: WO2019/095907
PCT Pub. Date: May 23, 2019

(65) Prior Publication Data
US 2022/0030550 A1  Jan. 27, 2022

(30) Foreign Application Priority Data
Nov. 17, 2017  (CN) .......................... 201711148879.4

(51) Int. Cl.
H04W 72/02  (2009.01)
H04L 1/00  (2006.01)
(Continued)

(52) U.S. Cl.
CPC .......... *H04W 72/02* (2013.01); *H04L 1/0071* (2013.01); *H04W 48/08* (2013.01); *H04W 72/0453* (2013.01); *H04W 72/23* (2023.01)

(58) Field of Classification Search
None
See application file for complete search history.

(56) References Cited

U.S. PATENT DOCUMENTS

| 8,073,062 B2 | 12/2011 | Classon et al. |
| 2008/0192847 A1 | 8/2008 | Classon et al. |

(Continued)

FOREIGN PATENT DOCUMENTS

| CN | 101102142 A | * | 1/2008 |
| CN | 101102142 A | | 1/2008 |

(Continued)

OTHER PUBLICATIONS

Notification of Reason for Refusal related to Application No. 10-2020-7017323; dated Sep. 10, 2021.
(Continued)

*Primary Examiner* — Srinivasa R Reddivalam
(74) *Attorney, Agent, or Firm* — von Briesen & Roper, s.c.

(57) ABSTRACT

The present disclosure provides a resource mapping method, a resource determination method, a network side device and a UE. The resource mapping method for the network side device includes: determining resource mapping configuration information about a PDCCH; and mapping each VRB to a corresponding PRB in accordance with the resource mapping configuration information, and transmitting the resource mapping configuration information to a UE, so as to enable the UE to acquire a bandwidth to which VRBs map
(Continued)

in a distributed manner in accordance with one or more configuration parameters in the resource mapping configuration information.

20 Claims, 8 Drawing Sheets

(51) Int. Cl.
*H04W 48/08* (2009.01)
*H04W 72/0453* (2023.01)
*H04W 72/23* (2023.01)

(56) References Cited

U.S. PATENT DOCUMENTS

| | | | |
|---|---|---|---|
| 2013/0064099 A1 | 3/2013 | Kim et al. | |
| 2017/0026943 A1* | 1/2017 | Kim | H04W 72/27 |
| 2019/0150118 A1* | 5/2019 | Nam | H04L 5/0094 |
| | | | 370/329 |
| 2019/0208482 A1* | 7/2019 | Tooher | H04L 5/0092 |
| 2019/0349943 A1* | 11/2019 | Wu | H04W 72/23 |
| 2020/0067665 A1* | 2/2020 | Dou | H04L 5/0035 |
| 2020/0120680 A1* | 4/2020 | Hwang | H04W 72/53 |

FOREIGN PATENT DOCUMENTS

| | | |
|---|---|---|
| CN | 101778394 A | 7/2010 |
| CN | 102412951 A | 4/2012 |
| CN | 102893688 A | 1/2013 |
| KR | 20130075716 A | 7/2013 |
| WO | WO 2013/149594 A1 | 10/2013 |
| WO | 12016169046 A1 | 10/2016 |

OTHER PUBLICATIONS

Chinese First Office Action Application No. 201711148879.4; dated Apr. 23, 2020.
International Search Report & Written Opinion related to Application No. PCT/CN2018/109976; dated Jan. 4, 2019.
VIVO; "On DL/UL resource allocation"; 3GPP TSG RAN WG1 Meeting 91; R1-1719793; Reno, USA, Nov. 27, 2017-Dec. 1, 2017.
Extended European Search Report for related Application No. 18879911.8; dated Oct. 8, 2020.
Chinese Office Action related to Application No. 202110129578.7 dated Mar. 2, 2022.

* cited by examiner

| Slot 1 | |
|---|---|
| 0 | 2 |
| 4 | 6 |
| 8 | 10 |
| 12 | 14 |
| 16 | 18 |
| 20 | 22 |
| 24 | 26 |
| 28 | 30 |
| 32 | 34 |
| 36 | 38 |
| 40 | 42 |
| 44 | 45 |
| 1 | 3 |
| 5 | 7 |
| 9 | 11 |
| 13 | 15 |
| 17 | 19 |
| 21 | 23 |
| 25 | 27 |
| 29 | 31 |
| 33 | 35 |
| 37 | 39 |
| 41 | 43 |
| 2 | 0 |
| 6 | 4 |
| 10 | 8 |
| 14 | 12 |
| 18 | 16 |
| 22 | 20 |
| 26 | 24 |
| 30 | 28 |
| 34 | 32 |
| 38 | 36 |
| 42 | 40 |
| 45 | 44 |
| 3 | 1 |
| 7 | 5 |
| 11 | 9 |
| 15 | 13 |
| 19 | 17 |
| 23 | 21 |
| 27 | 25 |
| 31 | 29 |
| 35 | 33 |
| 39 | 37 |
| 43 | 41 |
| 46 | 48 |
| 47 | 49 |
| 48 | 46 |
| 49 | 47 |

| Slot 2 | |
|---|---|
| 0 | 2 |
| 4 | 6 |
| 8 | 10 |
| 12 | 13 |
| 14 | 15 |
| 16 | 17 |
| 1 | 3 |
| 5 | 7 |
| 9 | 11 |
| 2 | 0 |
| 6 | 4 |
| 10 | 8 |
| 13 | 12 |
| 15 | 14 |
| 17 | 16 |
| 3 | 1 |
| 7 | 5 |
| 11 | 9 |
| 18 | 20 |
| 22 | 24 |
| 26 | 28 |
| 30 | 31 |
| 32 | 33 |
| 34 | 35 |
| 19 | 21 |
| 23 | 25 |
| 27 | 29 |
| 20 | 18 |
| 24 | 22 |
| 28 | 26 |
| 31 | 30 |
| 33 | 32 |
| 35 | 34 |
| 21 | 19 |
| 25 | 23 |
| 29 | 27 |
| 36 | 38 |
| 40 | 42 |
| 44 | 46 |
| 48 | 49 |
| 37 | 39 |
| 41 | 43 |
| 45 | 47 |
| 38 | 36 |
| 42 | 40 |
| 46 | 44 |
| 49 | 48 |
| 39 | 37 |
| 43 | 41 |
| 47 | 45 |

FIG. 2

| $n_{VRB}$ | $n_{PRB}$ |
|---|---|
| 0 | 0 |
| 1 | 6 |
| 2 | 12 |
| 3 | 18 |
| 4 | 1 |
| 5 | 7 |
| 6 | 13 |
| 7 | 19 |
| 8 | 2 |
| 9 | 8 |
| 10 | 14 |
| 11 | 20 |
| 12 | 3 |
| 13 | 9 |
| 14 | 15 |
| 15 | 21 |
| 16 | 4 |
| 17 | 10 |
| 18 | 16 |
| 19 | 22 |
| 20 | 5 |
| 21 | 11 |
| 22 | 17 |
| 23 | 23 |
| 24 | 24 |

FIG. 4

| $n_{VRB}$ | $n_{PRB}$ |
|---|---|
| 0 | |
| 1 | |
| 2 | |
| 3 | |
| 4 | |
| 5 | |
| 6 | |
| 7 | |
| 8 | |
| 9 | 9 |
| 10 | 12 |
| 11 | 15 |
| 12 | 10 |
| 13 | 13 |
| 14 | 14 |
| 15 | 11 |
| 16 | |
| 17 | |
| 18 | |
| 19 | |
| 20 | |
| 21 | |
| 22 | |
| 23 | |
| 24 | |

FIG. 5

RESOURCE MAPPING METHOD, RESOURCE DETERMINATION METHOD, NETWORK SIDE DEVICE AND USER EQUIPMENT

CROSS-REFERENCE TO RELATED APPLICATION

The present application is the U.S. national phase of PCT Application No. PCT/CN2018/109976 filed on Oct. 12, 2018, which claims a priority of the Chinese patent application 201711148879.4 filed on Nov. 17, 2017, which are incorporated herein by reference in their entirety.

TECHNICAL FIELD

The present disclosure relates to the field of communication technology, in particular to a resource mapping method, a resource determination method, a network side device, and a User Equipment (UE).

BACKGROUND

In the related art, a communication protocol fails to support resource mapping of distributed Virtual Resource Blocks (DVRBs) in the case of large resource allocation and a large bandwidth configuration. Due to the introduction of a large bandwidth and Code Block Group (CBG) transmission into a $5^{th}$-Generation (5G) system, it is necessary to support the DVRB mapping in a scenario with the large resource allocation.

In the case of small resource allocation and the large bandwidth configuration, e.g., more than 50 Physical Resource Block (PRBs) as speculated in a Long Term Evolution (LTE) system, the LTE system supports the DVRB mapping using a smaller frequency gap, e.g., at a level of one quarter of a cell bandwidth. Due to the smaller frequency gap, the distributed transmission is allowed to be performed at a part of the entire cell bandwidth.

In a New Radio (NR) system, there are demands on both the large resource allocation and the small resource allocation concurrently, so an integration scheme needs to be provided.

In addition, there are two types of Precoding Resource Block Groups (PRGs) in the NR system, i.e., type 1 and type 2, so it is necessary to design different DVRB mapping schemes for the two types respectively, and determine parameters of an interleaver for the DVRB mapping.

SUMMARY

In one aspect, the present disclosure provides in some embodiments a resource mapping method for a network side device, including: determining resource mapping configuration information about a Physical Downlink Control Channel (PDCCH); and mapping each VRB to a corresponding PRB in accordance with the resource mapping configuration information, and transmitting the resource mapping configuration information to a UE, so as to enable the UE to acquire a bandwidth to which VRBs map in a distributed manner in accordance with one or more configuration parameters in the resource mapping configuration information. The one or more configuration parameters in the resource mapping configuration information include at least one of the quantity $N_{VRB}^{DL}$ of the VRBs available for a downlink bandwidth, a frequency gap of PRBs to which adjacent VRBs map, a transmission bandwidth where the UE is located, and a bandwidth occupied by scheduled data.

In another aspect, the present disclosure provides in some embodiments a resource determination method for a UE, including: receiving resource mapping configuration information about a PDCCH from a network side device; and determining a bandwidth to which VRBs map in a distributed manner in accordance with one or more configuration parameters in the resource mapping configuration information. The one or more configuration parameters in the resource mapping configuration information include at least one of the quantity $N_{VRB}^{DL}$ of VRBs available for a downlink bandwidth, a frequency gap of PRBs to which adjacent VRBs map, a transmission bandwidth where the UE is located, and a bandwidth occupied by scheduled data.

In yet another aspect, the present disclosure provides in some embodiments a network side device, including: a processing module configured to determine resource mapping configuration information about a PDCCH, and map each VRB to a corresponding PRB in accordance with the resource mapping configuration information; and a transmission module configured to transmit the resource mapping configuration information to a UE, so as to enable the UE to acquire a bandwidth to which VRBs map in a distributed manner in accordance with one or more configuration parameters in the resource mapping configuration information. The one or more configuration parameters in the resource mapping configuration information include at least one of the quantity $N_{VRB}^{DL}$ of the VRBs available for a downlink bandwidth, a frequency gap of PRBs to which adjacent VRBs map, a transmission bandwidth where the UE is located, and a bandwidth occupied by scheduled data.

In still yet another aspect, the present disclosure provides in some embodiments a UE, including: a reception module configured to receive resource mapping configuration information about a PDCCH from a network side device; and a processing module configured to determine a bandwidth to which VRBs map in a distributed manner in accordance with one or more configuration parameters in the resource mapping configuration information. The one or more configuration parameters in the resource mapping configuration information include at least one of the quantity $N_{VRB}^{DL}$ of VRBs available for a downlink bandwidth, a frequency gap of PRBs to which adjacent VRBs map, a transmission bandwidth where the UE is located, and a bandwidth occupied by scheduled data.

In still yet another aspect, the present disclosure provides in some embodiments a network side device, including a memory, a processor, and a computer program stored in the memory and executed by the processor. The processor is configured to execute the computer program so as to implement the above-mentioned resource mapping method.

In still yet another aspect, the present disclosure provides in some embodiments a UE, including a memory, a processor, and a computer program stored in the memory and executed by the processor. The processor is configured to execute the computer program so as to implement the above-mentioned resource determination method.

In still yet another aspect, the present disclosure provides in some embodiments a computer-readable storage medium storing therein a computer program. The computer program is executed by a processor so as to implement the above-mentioned resource mapping method or the above-mentioned resource determination method.

BRIEF DESCRIPTION OF THE DRAWINGS

FIG. 2 is a schematic view showing the mapping of DVRBs within GAP1 and GAP2 in the art;

FIG. 4 is a schematic view showing the mapping of DVRBs at a given bandwidth according to one embodiment of the present disclosure;

FIG. 5 is a schematic view showing the mapping of the DVRBs at a scheduled bandwidth according to one embodiment of the present disclosure;

DETAILED DESCRIPTION

Figure 1:
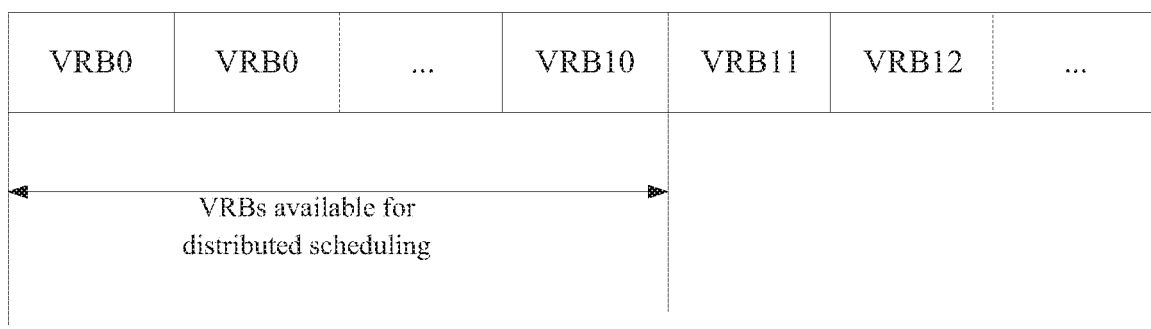
FIG. 1 is a schematic view showing VRBs available for distributed scheduling in the art.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

When a network side device makes a decision on the allocation of some RBs to a specific UE, the network side device may probably take downlink channel quality related to a time domain and a frequency domain into consideration. In other words, far channel-related frequency selective scheduling, a channel change, e.g., a channel change caused by frequency selective fading, may be taken into consideration. Then, RBs with well channel quality (which are not necessarily consecutive) may be allocated to the UE. In this way, it is able to probably improve a data rate of the UE and a throughput of an entire cell remarkably.

However, during the frequency selective scheduling, the UE is required to report the downlink channel quality to the network side device, resulting in a large signaling overhead. In addition, it is necessary to ensure that the network side device is capable of receiving information about the downlink channel quality successfully and timely, thereby to prevent the network side device from not receiving the information or receiving the outdated information. Hence, in some scenarios, the frequency selective scheduling is non-applicable. For example, for a low-speed service, e.g., a voice service, feedback signaling related to the frequency selection may result in a larger overhead than it is worth. In a scenario where the UE moves at a high speed, e.g., on a high-speed train moving at a high speed, it is very difficult or impossible to track the real-time channel quality, so it is impossible to provide the accurate channel quality for the frequency selective scheduling.

In this case, as a feasible scheme, downlink data is distributed to non-consecutive RBs in the frequency domain, so as to acquire frequency diversity gain, thereby to improve the transmission reliability.

In order to implement the resource mapping for the above two purposes, such concepts as PRB, i.e., physical resource block, and VRB, i.e., virtual resource block, have been introduced. Usually, the network side device indicates resource information to the UE through the VRB. A specific physical resource mapping needs to be acquired merely through mapping each VRB to a corresponding PRB. Generally speaking, localized PRBs represent consecutive PRBs occupied by the UE, and distributed PRBs represent non-consecutive PRBS occupied by the UE at a bandwidth. In this way, it is able to improve the frequency diversity gain of a system, thereby to improve an anti-interference capability of the system.

Two types of VRBs are defined in an LTE system, i.e., a localized VRB (LVRB) and a distributed VRB (DVRB).

In a localized resource mapping mode, VRB pairs correspond to the PRB pairs respectively. In other words, a position of each VRB is just a position of the corresponding PRB, and a serial number of each PRB is just a serial number of the corresponding VRB, $n_{PRB}=n_{VRB}$, within the range of 0 to $N_{VRB}^{DL}-1$, where $N_{VRB}^{DL}$ represents the quantity of downlink VRBs, and $n_{pRB}$ represents a serial number of each downlink PRB.

In a distributed resource mapping mode, the VRB pairs do not correspond to the PRB pairs respectively, the serial numbers of the consecutive VRBs are mapped to the serial numbers of the non-consecutive PRBs, and different mappings are provided within two slots of one subframe, so as to achieve the resource allocation in a distributed manner, as shown in FIG. 1. No matter whether mapping the consecutive VRB pairs to the non-consecutive PRB pairs or providing a certain frequency gap for the transmission of the two PRBs in each PRB pair (which may be considered as slot-based frequency hopping), its purpose is to achieve a diversity effect in the frequency.

It should be appreciated that, not all the VRBs may be used for interleaving. When $n_{VRB}$ is used to represent a frequency-domain position of each VRB, the VRBs for interleaving may have the serial numbers from 0 to $N_{VRB}^{DL}-1$. Merely the VRBs within this range may be used for the interleaving of the RB pairs and for the VRB resource allocation in a distributed manner. A principal purpose is to reduce the risk of resource conflict when the resources are reused for UEs in various resource allocation modes, i.e., to concentrate the distributed resources onto some physical resources.

As shown in FIG. 1, $n_{VRB}$ is within the range of 0 to 10, the serial numbers of the RBs may probably be allocated to 11 VRBs, i.e., 0 to 10, when the distributed resource scheduling is performed by the network side device. Here, the parameter $N_{VRB}^{DL}$ does not represent the quantity of the RBs at a downlink bandwidth, i.e., $N_{RB}^{DL}$. The parameter $N_{VRB}^{DL}$ may be calculated as specified in an LTE protocol.

(1) When GAP1 is used, $N_{VRB}^{DL}=N_{VRB,gap1}^{DL}=2\cdot\min(N_{gap}, N_{RB}^{DL}-N_{gap})$. For example, when a current bandwidth is 5 MHz, $N_{VRB,gap1}^{DL}=12$ and $N_{DL}^{RB}=25$, $N_{VRB}^{DL}=2\cdot\min(12,25-12)=24$. When the current bandwidth is 10 MHz, $N_{VRB,gap1}^{DL}=27$ and $N_{DL}^{RB}=50$, $N_{VRB}^{DL}=2\cdot\min(27,50-27)=46$. Hence, for the 10 MHz bandwidth, when the frequency gap GAP1 is used, merely 46 VRB pairs may be used for the frequency interleaving of the RBs and for the RB allocation in a distributed manner.

(2) When GAP2 is used, $N_{VRB}^{DL}=N_{VRB,gap2}^{DL}=\lfloor N_{RB}^{DL}/2N_{gap}\rfloor\cdot 2N_{gap}$. For example, when the current bandwidth is 10 MHz, $N_{VRB,gap2}^{DL}=9$ and $N_{DL}^{RB}=50$, $N_{VRB}^{DL}=\text{floor}(50/18)\times 18=36$. Hence, for the 10 MHz bandwidth, when the frequency gap GAP2 is used, merely 36 VRB pairs may be used for the frequency interleaving of the RBs and for the RB allocation in a distributed manner.

$N_{VRB,gap1}^{DL}$ and $N_{VRB,gap2}^{DL}$ are defined in Table 1.

TABLE 1

(from Section 6.2.3.2 in TS36.211)

| $N_{RB}^{DL}$ | $N_{gap}$ | |
|---|---|---|
| | $N_{gap, 1}$ | $N_{gap, 2}$ |
| 6-10 | $\lceil N_{RB}^{DL}/2 \rceil$ | N/A |
| 11 | 4 | N/A |
| 12-19 | 8 | N/A |
| 20-26 | 12 | N/A |
| 27-44 | 18 | N/A |
| 45-49 | 27 | N/A |
| 50-63 | 27 | 9 |
| 64-79 | 32 | 16 |
| 80-110 | 48 | 16 |

Generally speaking, the mapping from the VRBs to the PRBs may be performed using an interleaver. In addition, in order to achieve the DVRB mapping, i.e., to enable the resources acquired after the mapping to be distributed as possible, logic resources after the flapping are required to be distributed uniformly as possible on the whole physical resources.

This procedure may be completed by a block interleaver. Through writing the VRBs into the block interleaver row-wise and reading the VRBs out from the block interleaver column-wise, the VRBs may be reordered and disorganized. Two most important parameters of the block interleaver, i.e., the quantity of rows and the quantity of columns, needs to be determined.

In the LTE design, as mentioned hereinabove, the resources acquired after the DVRB mapping may be distributed onto the entire bandwidth, so such a problem as resource fragmentation may occur to some extent, and it is thereby necessary to limit the bandwidth for the resource mapping.

Hence, the following principles have been set forth in the 4G LTE design.

(1) When a distributed VRB allocation mode is used by a Downlink Control Information (DCI) format 1A/1B/1D, a Cyclic Redundancy Check (CRC) of the DCI is scrambled with a Cell Radio Network Temporary Identifier (C-RNTI), and the downlink bandwidth includes 6 to 49 RBs, the quantity of the VRBs allocated for the corresponding LIE may be from 1 to at most $N_{VRB}^{DL}$, and this value is very close to a system bandwidth, as specified in the protocol. However, when the downlink bandwidth includes 50 to 110 RBs, the quantity of the VRBs allocated for the corresponding UE may be from 1 to at most 16.

(2) During the distributed mapping from the VRBs to the PRBs, it is necessary to prevent a length of the consecutive RBs from being greater than a half of the system bandwidth, because this may lead to the resource fragmentation.

For example, when 50 PRBs are configured in the GAP1 and GAP2, FIG. 2 shows the resources acquired after the mapping of first 16 VRBs, where each digit represents a logic serial number of the VRB.

In the LTE system, intra-subframe hopping is further used for the DVRB, i.e., the hopping is used within two slots of one subframe, so FIG. 2 shows the mapping within the two slots. As shown in FIG. 2, the DVRB mapping in the GAP1 mainly differs from the DVRB mapping in the GAP2 in a distribution bandwidth of the resources acquired after the mapping. The distribution bandwidth in GAP1 is the system bandwidth, while the distribution bandwidth in the GAP2 is about ½ of the system bandwidth.

For PRB bundling, i.e., physical resource block bundling, in order to increase the quality of channel estimation in the LTE system, it is presumed that a same precoder (beamforming vector) is used by a plurality of PRBs, so that a receiving end (i.e., the UE) may perform the channel estimation jointly on the plurality of PRBs. In the LTE system, such a configuration is called as Precoding Resource block Group (PRG) configuration.

It is presumed that a precoding granularity for the UE in a serving cell includes a plurality of PRBs in the frequency domain. A PRG size depends on a sum of system bandwidths, and each PRB includes consecutive PRBs. For the UE, it is presumed that the same precoder is used by all predetermined PRBs in one PRG. The PRG size is associated with the system bandwidth in the LTE system, as shown in Table 2, where P' represents the quantity of PRBs in one PRG, i.e., the PRB size.

TABLE 2

| System Bandwidth ($N_{RB}^{DL}$) | PRG Size (P') (PRBs) |
|---|---|
| ≤10 | 1 |
| 11-26 | 2 |
| 27-63 | 3 |
| 64-110 | 2 |

In the resource allocation of a type 0 in the LTE system, the resources allocated to the UE are represented in the form of a bitmap, and each bit in the bitmap represents one Resource Block Group (RBG). When a bit has a value of 1, it means that a corresponding RB has been allocated for the UE, and when the bit has a value of 0, it means that the corresponding RB has not be allocated. The RBG includes one VRB or a plurality of consecutive VRBs of a localized type. An RBG size P (i.e., the quantity of RBs included in the RBG) is associated with the system bandwidth, as shown in Table 3.

TABLE 3

| System Bandwidth $N_{RB}^{DL}$ | RBG Size (P) |
|---|---|
| ≤10 | 1 |
| 11-26 | 2 |
| 27-63 | 3 |
| 64-110 | 4 |

There may probably two types of PRG configurations in a 5G NR system, i.e., type 1 and type 2. In type 1, a set of PRG sizes, e.g., [1,2,4,8,16], are configured or predefined for the network side device, and the PRB size used by the UE is dynamically indicated through L1 signaling. In type 2, the PRG size is equal to the quantity of the resources scheduled continuously.

Two types of resource allocation are supported in the NR system, i.e., a bitmap type (type 0) and a continuous resource allocation type (type 1).

In the type 0, the bitmap is used. Each bit in the bitmap represents one RBG, and the RBG size may probably be associated with the bandwidth. For example, when each RBG includes 4 RBs, the 20 M system bandwidth may include 25 RBGs totally, and the bitmap in the DCI may have 25 bits. When a certain RBG has been allocated for the UE, a corresponding bit in the bitmap of the DCI for the UE may be set as 1.

In the type 1, the consecutive VRBs are allocated for the UE, and the mapping from the VRBs to the actual PRBs may be in a localized or distributed form.

In the related art, a communication protocol fails to support resource mapping of DVRBs in the case of large resource allocation and a large bandwidth configuration. Due to the introduction of a large bandwidth and CBG transmission into the 5G system, it is necessary to support the DVRB mapping in a scenario with the large resource allocation.

There are two types of PRGs in the NR system, i.e., type 1 and type 2, so it is necessary to design different DVRB mapping schemes for the two types respectively, and determine parameters of the interleaver for the DVRB mapping.

An object of the present disclosure is to provide a resource mapping method, a resource determination method, a network side device and a UE, so as to meet the requirements on the resource mapping of the PRGs of the type 1 and the type 2.

Figure 3:
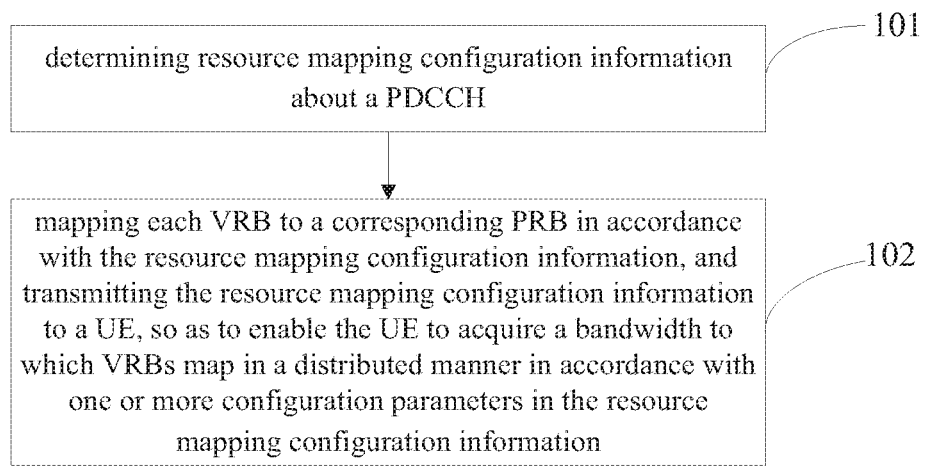
FIG. 3 is a flow chart of a resource mapping method according to one embodiment of the present disclosure.

The present disclosure provides in some embodiments a resource mapping method for a network side device which, as shown in FIG. 3, includes: Step 101 of determining resource mapping configuration information about a PDCCH; and Step 102 of mapping each VRB to a corresponding PRB in accordance with the resource mapping configuration information, and transmitting the resource mapping configuration information to a UE, so as to enable the UE to acquire a bandwidth to which VRBs map in a distributed manner in accordance with one or more configuration parameters in the resource mapping configuration information. The one or more configuration parameters in the resource mapping configuration information may include at least one of the quantity $N_{VRB}^{DL}$ of the VRBs available for a downlink bandwidth, a frequency gap of PRBs to which adjacent VRBs map, a transmission bandwidth where the UE is located, and a bandwidth occupied by scheduled data.

According to the embodiments of the present disclosure, the network side device may transmit the resource mapping configuration information about the PDCCH to the UE, and the one or more configuration parameters may be carried in the resource mapping configuration information. The UE may determine the bandwidth to which the resources map in a distributed manner in accordance with the one or more configuration parameters in the resource mapping configuration information, and then receive downlink data at the determined bandwidth. As a result, it is able to meet the requirements on the resource mapping of PRGs of a type 1 and a type 2, thereby to improve the resource utilization while ensuring the resource diversity gain, and ensure the resource continuity.

During the DVRB mapping, usually the following parameters need to be determined.

(1) Interleaving granularity ($N_{unit}$) of a block interleaver. Usually, the interleaving granularity may be P' or a multiple of P'. All the VRBs may be divided into $N_{VRB}^{DL}/N_{unit}$ groups at the granularity of $N_{unit}$.

(2) The quantity of columns $N_{col}$ (or rows) of an interleaving matrix, i.e., the quantity of columns of the block interleaver. The block interleaver may be applied to $N_{VRB}^{DL}/N_{unit}$ groups, i.e., the VRBs may be reordered and disorganized through writing the VRBs into the block interleaver row-wise and reading the VRBs out from the block interleaver column-wise, or through writing the VRBs into the block interleaver column-wise and reading the VRBs out from the block interleaver row-wise.

The interleaved logic resources may be mapped to the physical resources. Usually, the resources acquired after the DVRB mapping may be distributed on the entire bandwidth, so the resource fragmentation may occur to some extent, and thereby it is necessary to limit the bandwidth for the resource mapping. At this time, the quantity $N_{VRB}^{DL}$ may be limited.

In the embodiments of the present disclosure, the resource mapping configuration information may include mapping functions f(•) from serial numbers of the VRBs to serial numbers of the PRBs or serial numbers of the mapping functions, and $n_{pRB}=f(n_{VRB}, n_s)$. Independent variables of each mapping function f(•) may at least include the serial numbers of the VRBs and serial numbers of slots. The serial numbers of the VRBs may be within the range of 0 to $N_{VRB}^{DL}-1$, and $n_{PRB}$ may have a value within a certain range. The value of $n_{PRB}$ shall not go beyond the limitation of the quantity of physical resources, and it may within the range of 0 to $N_{RB}^{DL}-1$. Here, the serial number of the each slot, i.e., $n_s$, is introduced as the independent variable so as to allow the randomization between the slots. In addition, for different values of $N_{RB}^{DL}$, $N_{unit}$ and $N_{col}$, mapping results from f(•) may be different from each other.

When $N_{VRB}^{DL}$ approaches to the total physical resources $N_{RB}^{DL}$, more available physical resources may be provided. However, due to a physically small frequency gap of the resources acquired after the mapping in a distributed manner, a small diversity gain may be acquired. When $N_{VRB}^{DL}$ is far less than the total physical resources $N_{RB}^{DL}$, fewer available physical resources may be provided. However, due to a physically large frequency gap of the resources acquired after the mapping in a distributed manner, a large diversity gain may be acquired.

In a first embodiment of the present disclosure, one DVRB mapping mode for the UE in a group of DVRB mapping modes (corresponding to different mapping bandwidths) may be notified through a protocol or a Radio Resource Control (RRC) signaling for the network side device. The transmitting the resource mapping configuration information to the UE may include: transmitting the resource mapping configuration information to the UE through RRC signaling, so as to enable the UE to select one resource mapping configuration mode from a plurality of resource mapping configuration modes; or transmitting a serial number of the resource mapping configuration information to the UE through the RRC signaling, so as to enable the UE to select one resource mapping configuration mode from the plurality of resource mapping configuration modes. The plurality of resource mapping configuration modes may include a plurality of preconfigured resource mapping configuration modes or a plurality of resource mapping configuration modes transmitted to the UE in advance, and each resource mapping configuration mode may include a corresponding mapping function and a range of the serial numbers of the VRBs.

In this embodiment, the network side device may control the DVRB mapping mode in a semi-static manner, e.g., control a discrete degree after the DVRB mapping, i.e., a size of the bandwidth occupied by the resource acquired after the mapping, so it is able to effectively control the resource fragmentation. The implementation will be described hereinafter.

The network side device may notify the UE of a specific DVRB mapping mode through the RRC signaling. For example, upon the receipt of RRC signaling i, a mapping function $f_i(\cdot)$ may be used. $f_i(\cdot)$ may be provided with different function forms. For example, after the DVRB mapping, the bandwidths corresponding to $f_i(\bullet)$ may be different (e.g., the entire bandwidth or a half of the bandwidth may be used in different scenarios), and $n_{VRB}$ may have the same or different ranges (corresponding to a scenario with small resource allocation and a large bandwidth configuration).

In a second embodiment of the present disclosure, one group of DVRB mapping modes for the UE (corresponding to different mapping bandwidths) may be configured through a protocol or the RRC signaling from the network side device, and then one DVRB mapping mode may be selected through L1 signaling. The transmitting the resource mapping configuration information to the UE may include: transmitting the resource mapping configuration information to the UE through the L1 signaling, so as to enable the UE to select one resource mapping configuration mode from a plurality of resource mapping configuration modes; or transmitting a serial number of the resource mapping configuration information to the UE through the L1 signaling, so as to enable the UE to select one resource mapping configuration mode from the plurality of resource mapping configuration modes. The plurality of resource mapping configuration modes may include a plurality of preconfigured resource mapping configuration modes or a plurality of resource mapping configuration modes transmitted to the UE through the RRC signaling, and each resource mapping configuration mode may include a corresponding mapping function and a range of the serial numbers of the VRBs.

In this embodiment, the network device may control the DVRB mapping mode dynamically, e.g., control a discrete degree after the DVRB mapping, i.e., a size of the bandwidth occupied by the resource acquired after the mapping, so it is able to effectively control the resource fragmentation. The implementation will be described hereinafter. The network side device may notify the UE of a group of DVRB mapping modes through the RRC signaling or the group of DVRB mapping modes may be specified in a protocol, and then a specific mapping mode may be notified through the L1 signaling dynamically. For example, upon the receipt of L1 signaling i, a mapping function $f_i(\bullet)$ may be used. $f_i(\bullet)$ may be provided with different function forms. For example, after the DVRB mapping, the bandwidths corresponding to $f_i(\bullet)$ may be different (e.g., the entire bandwidth or a half of the bandwidth may be used in different scenarios), and $n_{VRB}$ may have the same or different ranges (corresponding to a scenario with small resource allocation and a large bandwidth configuration).

In a third embodiment of the present disclosure, the UE may implicitly determine one DVRB mapping mode in a group of DVRB mapping modes (corresponding to different mapping bandwidths) in accordance with a bandwidth for an actually-scheduled resource. The bandwidth for the actually-scheduled resource may be just a bandwidth occupied by the scheduled data, and different from the transmission bandwidth, it means the bandwidth used for the actually scheduling. The transmitting the resource mapping configuration information to the UE may include notifying the quantity of scheduled RBs to the UE, so as to enable the UE to select on resource mapping configuration mode from a plurality of resource mapping configuration modes in accordance with the quantity of the scheduled RBs. The plurality of resource mapping configuration modes may include a plurality of preconfigured resource mapping configuration modes or a plurality of resource mapping modes transmitted to the UE through the RRC signaling, each resource mapping configuration mode may include a corresponding mapping function and a range of the serial numbers of the VRBs, and each resource mapping configuration mode may correspond to a certain quantity of the scheduled RBs.

In the first and second embodiments, a resource distribution operation is performed on the DVRBs in a bandwidth, and in the third embodiment, the resource distribution operation is merely performed on the scheduled resources. For ease of understanding, FIGS. 4 and 5 show the difference therebetween. In FIGS. 4 and 5, each box with dots represents the scheduled VRB, and the DVRBs in the scheduled bandwidth refers to the shuffling of the PRBs in a PRBS resource set corresponding to the VRB. In some cases, it is able to optimize the CBG-based data transmission performance without causing any resource fragmentation.

To be specific, the network side device may notify a group of DVRB mapping modes to the UE through the RRC signaling or the group of DVRB mapping modes may be specified in a protocol. The UE may determine a specific mapping mode dynamically in accordance with the quantity of the scheduled resources (usually the quantity of the VRBs). For example, $f_1(\bullet)$ may be used when the quantity of the scheduled resources is smaller than or equal to a given value, and $f_2(\bullet)$ may be used when the quantity of the scheduled resources is greater than the given value, $f_1(\bullet)$ and $f_2(\bullet)$ may have different function forms. After the DVRB mapping, the bandwidths corresponding to $f_1(\bullet)$ and $f_2(\bullet)$ may be different (e.g., the entire bandwidth or a half of the bandwidth may be used in different scenarios); or the DVRBs corresponding to $f_1(\bullet)$ may be distributed at a given bandwidth while the DVRBs corresponding to $f_2(\bullet)$ may be distributed at a scheduled bandwidth. $n_{VRB}$ may have the same or different ranges (corresponding to a scenario with small resource allocation and a large bandwidth configuration).

In a fourth embodiment of the present disclosure, one DVRB mapping mode may be determined implicitly from one group of DVRB mapping modes in accordance with a configured possible transmission bandwidth (a Bandwidth Part (BWP) or a bandwidth for a carrier). The transmitting the resource mapping configuration information to the UE may include transmitting BWP configurations allocated for the UE to the UE, so as to enable the UE to select one resource mapping configuration mode from a plurality of resource mapping configuration modes in accordance with the BWP configurations. The plurality of resource mapping configuration modes may include a plurality of preconfigured resource mapping configuration modes or a plurality of resource mapping configuration modes transmitted to the UE through the RRC signaling, each resource mapping configuration mode may include a corresponding mapping function and a range of the serial numbers of the VRBs, and each resource mapping configuration mode may correspond to one BWP configuration.

To be specific, the network side device may notify one group of DVRB mapping modes to the UE through the RRC signaling, or the group of DVRB mapping modes may be specified in a protocol. The UE may determine a specific mapping mode dynamically in accordance with the BWP. For example, when a mapping function $f_i(\bullet)$ is used, $f_i(\bullet)$ may have different function forms. After the DVRB mapping, the bandwidths corresponding to $f_i(\bullet)$ may be different (the entire bandwidth or a half of the bandwidth may be used in different scenarios); or the DVRBs corresponding to $f_i(\bullet)$ may be selected from the DVRBs at a given bandwidth or a scheduled bandwidth. $n_{VRB}$ may have the same or different ranges (corresponding to a scenario with small resource allocation and a large bandwidth configuration).

In a fifth embodiment of the present disclosure, one DVRB mapping mode may be determined implicitly from a group of DVRB mapping modes (corresponding to different mapping bandwidths) in accordance with a BWP and a resource allocation type (e.g., type 0 or type 1). The transmitting the resource mapping configuration information to the UE may include transmitting BWP configurations allocated for the UE and the resource allocation types to the UE, so as to enable the UE to select one resource mapping configuration mode from a plurality of resource mapping configuration modes in accordance with the BWP configurations and the resource allocation types. The plurality of resource mapping configuration modes may include a plurality of preconfigured resource mapping configuration modes or a plurality of resource mapping configuration modes transmitted to the UE through the RRC signaling, and each resource mapping configuration mode may correspond to a combination of one BWP configuration and one resource allocation type.

To be specific, for a downlink resource allocation type 0 (a bitmap type) in the NR system, the DVRBs may be distributed on given scheduled resources, i.e., the interleaving may be merely performed by the block interleaver on the scheduled VRBs. For a downlink resource allocation type 1 (consecutive resource allocation) in the NR system, the DVRBs may be distributed at a given bandwidth, i.e., the interleaving may be performed by the block interleaver within the BWP or a known bandwidth.

In a sixth embodiment of the present disclosure, the DVRB mapping mode may be determined in accordance with the DCI format. The transmitting the resource mapping configuration information to the UE may include transmitting the resource mapping configuration information to the UE through the DCI, so as to enable the UE to select one resource mapping configuration mode from a plurality of resource mapping configuration modes in accordance with the DCI format. The plurality of resource mapping configuration modes may include a plurality of preconfigured resource mapping configuration modes or a plurality of resource mapping configuration modes transmitted to the UE through the RRC signaling, and each resource mapping configuration mode may correspond to one DCI format.

To be specific, fallback DCI and common DCI may have different DCI formats, so different DVRB mapping modes may be used. For example, for the fallback DCI, the DVRBs may be distributed at a given bandwidth, i.e., the interleaving may be performed by the block interleaver within a BWP or a known bandwidth. For the common DCI, the DVRBs may be distributed on scheduled resources, i.e., the interleaving may be performed by the block interleaver merely on the scheduled VRBs.

Further, the transmitting the resource mapping configuration information to the UE may include transmitting the resource mapping configuration information to the UE through the DCI, so as to enable the UE to select one resource mapping configuration mode from a plurality of resource mapping configuration modes in accordance with the DCI format. In the plurality of resource mapping configuration modes, a bandwidth to which the resources map in a distributed manner may be a pre-allocated bandwidth or a bandwidth for an actually-scheduled resource. The pre-allocated bandwidth may be configured by the network side device or acquired in accordance with at least one of the quantity $N_{VRB}^{DL}$ of the VRBs available for the downlink bandwidth, the frequency gap of the adjacent VRBs after the adjacent VRBs have been mapped to the corresponding PRBs, the transmission bandwidth where the UE is located, and the bandwidth occupied by the scheduled data.

In a seventh embodiment of the present disclosure, in the case of initial access, there is no UE-specific signaling transmitted to the UE, so it is necessary to perform special processing so as to determine the specific DVRB mapping mode. For example, in the case of the initial access, the network side device may transmit the fallback DCI so as to deliver control signaling, and a fixed PRG type may be used so as to simplify the procedure.

In a DVRB mapping mode, the UE may receive, by default, a Physical Downlink Shared Channel (PDSCH) carrying Remaining System Information (RMSI), a message 2 (Random Access Response (RAR)), a message 4 and Other System Information (OSI) as follows. (1) The DVRBs may be distributed at a given bandwidth, i.e., the interleaving may be performed by the block interleaver within a BWP for the initial access. (2) The DVRBs may be distributed on the scheduled resources, i.e., the interleaving may be performed by the block interleaver merely on the scheduled VRBs. (3) One DVRB mapping mode may be determined implicitly from a group of DVRB mapping modes (corresponding to different mapping bandwidth) in accordance with the bandwidth for the actually-scheduled resources. The transmitting the resource mapping configuration information to the L1 may include notifying values of the bandwidths for the actually-scheduled resources to the UE, so as to enable the UE to select one resource mapping configuration mode from a plurality of resource mapping configuration modes in accordance with the values of the bandwidths for the actually-scheduled resources. The plurality of resource mapping configuration modes may include a plurality of preconfigured resource mapping configuration modes, and each resource mapping configuration mode may correspond to one value of the bandwidth.

The RMSI may be system information introduced into the 5G NR system and similar to a System Information Block (SIB) 1 in the LTE system. The OSI may be system information introduced into the 5G NR system and similar to other SIBx in the LTE system other than the SIB1.

In the design of a physical layer for a conventional 4G LTE system, a Physical Random Access Channel (PRACH) is mainly used for the UE to initiate an uplink random access request, so that the network side device determines a subsequent response in accordance with the request.

In the related art, a random access process mainly includes four steps, i.e., Step 1 of transmitting a preamble (message 1), Step 2 of transmitting an RAR (message 2), Step 3 of transmitting an L2/3 message (message 3), and Step 4 of transmitting a contention resolution message (message 4).

Step 1 mainly includes mapping a sequence generated by the preamble at a physical layer to time-frequency-domain resources for the physical layer, and then transmitting the preamble. Step 2 mainly includes transmitting, by the network side device, the RAR through the PDSCH, and determining a slot within which an access preamble has been monitored in accordance with a Random Access Radio Network Temporary Identity (RA-RNTI). When a collision occurs for several UEs due to the selection of a same ID from a same time-frequency-domain resource, these UEs may also receive the RAR. Step 3 includes scheduling and allocating a first message associated with the random access on a Physical Uplink Shared Channel (PDSCH), and a determined random access process message, e.g., an RRC connection request message, a location area update message or a scheduling request message, may be carried in the message. Step 4 includes transmitting the contention resolution message with respect to a C-RNTI or a temporary C-RNTI. In a latter case, the contention resolution message may be transmitted with respect to a UE ID carried in the L2/L3 message. The contention resolution message may support a Hybrid. Automatic Repeat reQuest (HARQ). When a contention conflict has occurred and one L2/L3 message has been decoded successfully, merely the UE which has monitored its own UE ID (or C-RNTI) may transmit an HARQ feedback message. The other UEs may determine that there is the conflict, and may not transmit the HARQ feedback message; instead, they may terminate the current access procedure as soon as possible and initiate a new random access.

Figure 6:
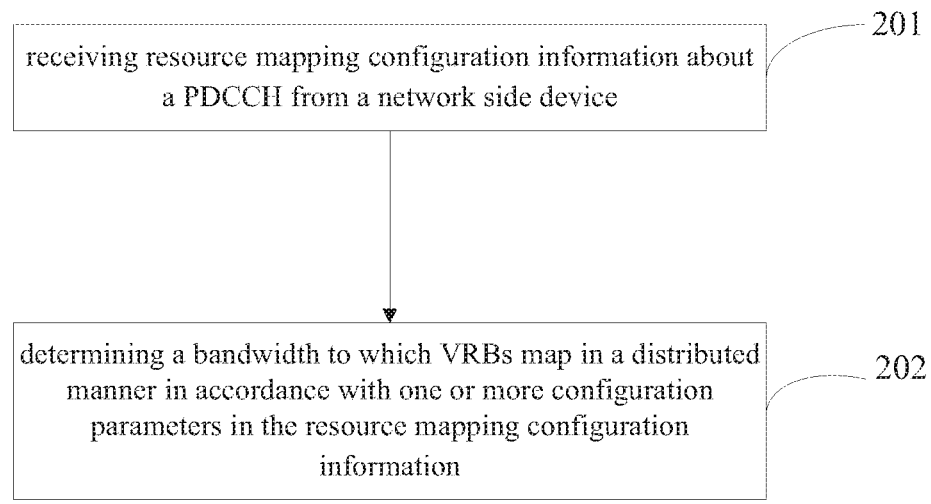
FIG. 6 is a flow chart of a resource determination method according to one embodiment of the present disclosure.

The present disclosure further provides in some embodiments a resource determination method for a UE which, as shown in FIG. 6, includes: Step 201 of receiving resource mapping configuration information about a PDCCH from a network side device; and Step 202 of determining a bandwidth to which VRBs map in a distributed manner in accordance with one or more configuration parameters in the resource mapping configuration information. The one or more configuration parameters in the resource mapping configuration information may include at least one of the quantity $N_{VRB}^{DL}$ of VRBs available for a downlink bandwidth, a frequency gap of PRBs to which adjacent VRBs map, a transmission bandwidth where the UE is located, and a bandwidth occupied by scheduled data.

According to the embodiments of the present disclosure, the network side device may transmit the resource mapping configuration information about the PDCCH to the UE, and the one or more configuration parameters may be carried in the resource mapping configuration information. The UE may determine the bandwidth to which the resources map in a distributed manner in accordance with the one or more configuration parameters in the resource mapping configuration information, and then receive downlink data at the determined bandwidth. As a result, it is able to meet the requirements on the resource mapping of PRGs of a type 1 and a type 2, thereby to improve the resource utilization while ensuring the resource diversity gain, and ensure the resource continuity.

Subsequent to determining the bandwidth to which the resources map in a distributed manner in accordance with the one or more configuration parameters in the resource mapping configuration information, the resource determination method may farther includes receiving the downlink data on the determined bandwidth.

Further, the resource mapping configuration information may include mapping functions from serial numbers of the VRBs to serial numbers of the PRBs or serial numbers of the mapping functions, independent variables of each mapping function may at least include the serial numbers of the VRBs and serial numbers of slots, and the serial numbers of the VRBs may be within the range of 0 to $N_{VRB}^{DL}-1$.

Further, the receiving the resource mapping configuration information about the PDCCH from the network side device may include receiving RRC signaling carrying the resource mapping configuration information from the network side device, and the RRC signaling may be used to notify the UE to select one resource mapping configuration mode from a plurality of resource mapping configuration modes. The plurality of resource mapping configuration modes may include a plurality of preconfigured resource mapping configuration modes or a plurality of resource mapping configuration modes transmitted to the UE in advance, and each resource mapping configuration mode may include a corresponding mapping function and the range of the serial numbers of the VRBs.

Further, the receiving the resource mapping configuration information about the PDCCH from the network side device may include receiving L1 signaling carrying the resource mapping configuration information from the network side device, and the L1 signaling may be used to notify the UE to select one resource mapping configuration mode from a plurality of resource mapping configuration modes. The plurality of resource mapping configuration modes may include a plurality of preconfigured resource mapping configuration modes or a plurality of resource mapping configuration modes transmitted to the UE through RRC signaling, and each resource mapping configuration mode may include a corresponding mapping function and the range of the serial numbers of the VRBs.

Further, the receiving the resource mapping configuration information about the PDCCH from the network side device may include receiving the quantity of scheduled RBs from the network side device, and selecting one resource mapping configuration mode from a plurality of resource mapping configuration modes in accordance with the quantity of the scheduled RBs. The plurality of resource mapping configuration modes may include a plurality of preconfigured resource mapping configuration modes or a plurality of resource mapping configuration modes transmitted to the UE through RRC signaling, each resource mapping configuration mode may include a corresponding mapping function and the range of the serial numbers of the VRBs, and each resource mapping configuration mode may correspond to one value of the quantity of the scheduled RBs.

Further, the receiving the resource mapping configuration information about the PDCCH from the network side device may include receiving BWP configurations allocated for the UE from the network side device, and selecting one resource mapping configuration mode from a plurality of resource mapping configuration modes in accordance with the BWP configurations. The plurality of resource mapping configuration modes may include a plurality of preconfigured resource mapping configuration modes or a plurality of resource mapping configuration modes transmitted to the UE through RRC signaling, each resource mapping configuration mode may include a corresponding mapping function and the range of the serial numbers of the VRBs, and each resource mapping configuration mode may correspond to one BWP configuration.

Further, the receiving the resource mapping configuration information about the PDCCH from the network side device may include receiving BWP configurations and resource allocation types allocated for the UE from the network side device, and selecting one resource mapping configuration mode from a plurality of resource mapping configuration modes in accordance with the BWP configurations and the resource allocation types. The plurality of resource mapping configuration modes may include a plurality of preconfigured resource mapping configuration modes or a plurality of resource mapping configuration modes transmitted to the UE through RRC signaling, and each resource mapping configuration mode may correspond to a combination of one BWP configuration and one resource allocation type.

Further, the receiving the resource mapping configuration information about the PDCCH from the network side device may include receiving DCI carrying the resource mapping configuration information from the network side device, and selecting one resource mapping configuration mode from a plurality of resource mapping configuration modes in accordance with DCI formats. The plurality of resource mapping configuration modes may include a plurality of preconfigured resource mapping configuration modes or a plurality of resource mapping configuration modes transmitted to the LIE through RRC signaling, and each resource mapping configuration mode may correspond to one DCI format.

Further, the receiving the resource mapping configuration information about the PDCCH from the network side device may include receiving DCI carrying the resource mapping configuration information from the network side device, and selecting one resource mapping configuration mode from a plurality of resource mapping configuration modes in accordance with DCI formats. In the plurality of resource mapping configuration modes, a bandwidth to which VRBs map in a distributed manner may be a pre-allocated bandwidth or a bandwidth for an actually-scheduled resource. The pre-allocated bandwidth may be configured by the network side device or acquired in accordance with at least one of the quantity $N_{VRB}^{DL}$ of the VRBs available for the downlink bandwidth, the frequency gap of the adjacent VRBs after the adjacent VRBs have been mapped to the corresponding PRBs, the transmission bandwidth where the UE is located, and the bandwidth occupied by the scheduled data.

Further, the receiving the resource mapping configuration information about the PDCCH from the network side device may include acquiring values of bandwidths for actually-scheduled resources from the network side device, and selecting one resource mapping configuration mode from a plurality of resource mapping configuration modes in accordance with the values of the bandwidths for the actually-scheduled resources. The plurality of resource mapping configuration modes may include a plurality of preconfigured resource mapping configuration modes or a plurality of resource mapping configuration modes transmitted to the UE through RRC signaling, and each resource mapping configuration mode may correspond to one value of the bandwidth.

Further, the resource mapping configuration information may be used to indicate that a bandwidth to which the resources map in a distributed manner is the pre-configured bandwidth or the bandwidth for the actually-scheduled resources when the UE receives a PDCCH carrying RMSI, a message 2, a message 4 and/or OSI in an initial access procedure.

Figure 7:
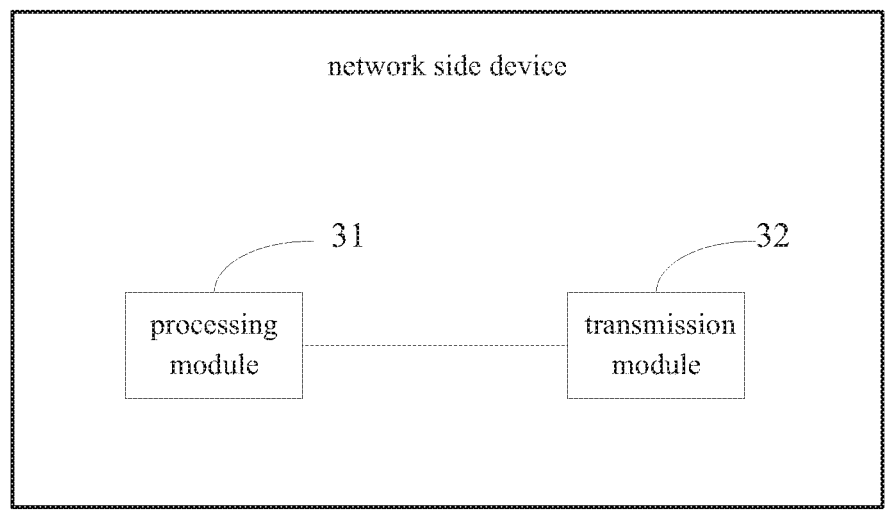
FIG. 7 is a block diagram of a network side device according to one embodiment of the present disclosure.

The present disclosure further provides in some embodiments a network side device which, as shown in FIG. 7, includes: a processing module 31 configured to determine resource mapping configuration information about a PDCCH, and map each VRB to a corresponding PRE in accordance with the resource mapping configuration information; and a transmission module 32 configured to transmit the resource mapping configuration information to a UE, so as to enable the UE to acquire a bandwidth to which VRBs map in a distributed manner in accordance with one or more configuration parameters in the resource mapping configuration information. The one or more configuration parameters in the resource mapping configuration information may include at least one of the quantity $N_{VRB}^{DL}$ of the VRBs available for a downlink bandwidth, a frequency gap of PRBs to which adjacent VRBs map, a transmission bandwidth where the UE is located, and a bandwidth occupied by scheduled data.

According to the embodiments of the present disclosure, the network side device may transmit the resource mapping configuration information about the PDCCH to the UE, and the one or more configuration parameters may be carried in the resource mapping configuration information. The UE may determine the bandwidth to which the resources map in a distributed manner in accordance with the one or more configuration parameters in the resource mapping configuration information, and then receive downlink data at the determined bandwidth. As a result, it is able to meet the requirements on the resource mapping of PRGs of a type 1 and a type 2, thereby to improve the resource utilization while ensuring the resource diversity gain, and ensure the resource continuity.

Further, the resource mapping configuration information may include mapping functions from serial numbers of the VRBs to serial numbers of the PRBs or serial numbers of the mapping functions, independent variables of each mapping function may at least include the serial numbers of the VRBs and serial numbers of slots, and the serial numbers of the VRBs may be within the range of 0 to $N_{VRB}^{DL}-1$.

The transmission module is further configured to transmit the resource mapping configuration information to the UE through RRC signaling, so as to enable the UE to select one resource mapping configuration mode from a plurality of resource mapping configuration modes. The plurality of resource mapping configuration modes may include a plurality of preconfigured resource mapping configuration modes or a plurality of resource mapping configuration modes transmitted to the UE in advance, and each resource mapping configuration mode may include a corresponding mapping function and the range of the serial numbers of the VRBs.

The transmission module is further configured to transmit the resource mapping configuration information to the UE through L1 signaling, so as to enable the UE to select one resource mapping configuration mode from a plurality of resource mapping configuration modes. The plurality of resource mapping configuration modes may include a plurality of preconfigured resource mapping configuration modes or a plurality of resource mapping configuration modes transmitted to the UE through RRC signaling, and each resource mapping configuration mode may include a corresponding mapping function and the range of the serial numbers of the VRBs.

The transmission module is further configured to notify the quantity of scheduled RBs to the UE, so as to enable the UE to select one resource mapping configuration mode from a plurality of resource mapping configuration modes in accordance with the quantity of the scheduled RBs. The plurality of resource mapping configuration modes may include a plurality of preconfigured resource mapping configuration modes or a plurality of resource mapping configuration modes transmitted to the UE through RRC signaling, each resource mapping configuration mode may include a corresponding mapping function and the range of the serial numbers of the VRBs, and each resource mapping configuration mode may correspond to one value of the quantity of the scheduled RBs.

The transmission module is further configured to transmit BWP configurations allocated for the UE to the UE, so as to enable the UE to select one resource mapping configuration mode from a plurality of resource mapping configuration modes in accordance with the BWP configurations. The plurality of resource mapping configuration modes may include a plurality of preconfigured resource mapping configuration modes or a plurality of resource mapping configuration modes transmitted to the UE through RRC signaling, each resource mapping configuration mode may include a corresponding mapping function and the range of the serial numbers of the VRBs, and each resource mapping configuration mode may correspond to one BWP configuration.

The transmission module is further configured to transmit BWP configurations and resource allocation types allocated for the UE to the UE, so as to enable the UE to select one resource mapping configuration mode from a plurality of resource mapping configuration modes in accordance with the BWP configurations and the resource allocation types. The plurality of resource mapping configuration modes may include a plurality of preconfigured resource mapping configuration modes or a plurality of resource mapping configuration modes transmitted to the UE through RRC signaling, and each resource mapping configuration mode may correspond to a combination of one BWP configuration and one resource allocation type.

The transmission module is further configured to transmit the resource mapping configuration information to the UE through DCI, so as to enable the UE to select one resource mapping configuration mode from a plurality of resource mapping configuration modes in accordance with DCI formats. The plurality of resource mapping configuration modes may include a plurality of preconfigured resource mapping configuration modes or a plurality of resource mapping configuration modes transmitted to the UE through RRC signaling, and each resource mapping configuration mode may correspond to one DCI format.

The transmission module is further configured to transmit the resource mapping configuration information to the UE through DCI, so as to enable the UE to select one resource mapping configuration mode from a plurality of resource mapping configuration modes in accordance with DCI formats. In the plurality of resource mapping configuration modes, a bandwidth to which VRBs map in a distributed manner may be a pre-allocated bandwidth or a bandwidth for an actually-scheduled resource. The pre-allocated bandwidth may be configured by the network side device or acquired in accordance with at least one of the quantity $N_{VRB}^{DL}$ of the VRBs available for the downlink bandwidth, the frequency gap of the adjacent VRBs after the adjacent VRBs have been mapped to the corresponding PRBs, the transmission bandwidth where the UE is located, and the bandwidth occupied by the scheduled data.

The transmission module is further configured to notify values of bandwidths for actually-scheduled resources to the UE, so as to enable the UE to select one resource mapping configuration mode from a plurality of resource mapping configuration modes in accordance with the values of the bandwidths for the actually-scheduled resources. The plurality of resource mapping configuration modes may include a plurality of preconfigured resource mapping configuration modes or a plurality of resource mapping configuration modes transmitted to the UE through RRC signaling, and each resource mapping configuration mode may correspond to one value of the bandwidth.

Further, the resource flapping configuration information may be used to indicate that a bandwidth to which the resources map in a distributed manner is the pre-configured bandwidth or the bandwidth for the actually-scheduled resources when the UE receives a PDSCH carrying RMSI, a message 2, a message 4 and/or OSI in an initial access procedure.

Figure 8:
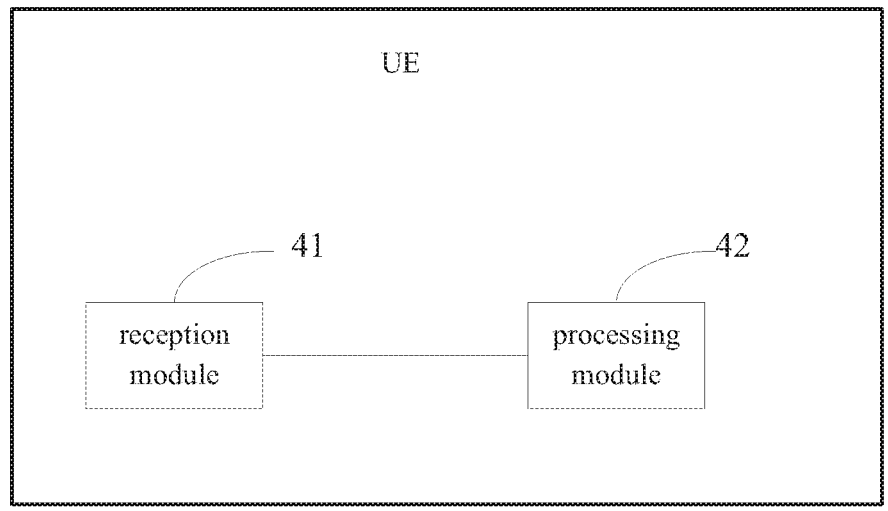
FIG. 8 is a block diagram of a UE according to one embodiment of the present disclosure.

The present disclosure further provides in some embodiments a UE which, as shown in FIG. 8, includes: a reception module 41 configured to receive resource mapping configuration information about a PDCCH from a network side device; and a processing module 42 configured to determine a bandwidth to which VRBs map in a distributed manner in accordance with one or more configuration parameters in the resource mapping configuration information. The one or more configuration parameters in the resource mapping configuration information may include at least one of the quantity $N_{VRB}^{DL}$ of VRBs available for a downlink bandwidth, a frequency gap of PRBs to which adjacent VRBs map, a transmission bandwidth where the UE is located, and a bandwidth occupied by scheduled data.

According to the embodiments of the present disclosure, the network side device may transmit the resource mapping configuration information about the PDCCH to the UE, and the one or more configuration parameters may be carried in the resource mapping configuration information. The UE may determine the bandwidth to which the resources map in a distributed manner in accordance with the one or more configuration parameters in the resource mapping configuration information, and then receive downlink data at the determined bandwidth. As a result, it is able to meet the requirements on the resource mapping of PRGs of a type 1 and a type 2, thereby to improve the resource utilization while ensuring the resource diversity gain, and ensure the resource continuity.

The UE may further include a data reception module configured to receive the downlink data on the determined bandwidth.

Further, the resource mapping configuration information may include mapping functions from serial numbers of the VRBs to serial numbers of the PRBs or serial numbers of the mapping functions, independent variables of each mapping function may at least include the serial numbers of the VRBs and serial numbers of slots, and the serial numbers of the VRBs may be within the range of 0 to $N_{VRB}^{DL}-1$.

The reception module is further configured to receive RRC signaling carrying the resource mapping configuration information from the network side device, and the RRC signaling may be used to notify the UE to select one resource mapping configuration mode from a plurality of resource mapping configuration modes. The plurality of resource mapping configuration modes may include a plurality of preconfigured resource mapping configuration modes or a plurality of resource mapping configuration modes transmitted to the UE in advance, and each resource mapping configuration mode may include a corresponding mapping function and the range of the serial numbers of the VRBs.

The reception module is further configured to receive L1 signaling carrying the resource mapping configuration information from the network side device, and the L1 signaling may be used to notify the UE to select one resource mapping configuration mode from a plurality of resource mapping configuration modes. The plurality of resource mapping configuration modes may include a plurality of preconfigured resource mapping configuration modes or a plurality of resource mapping configuration modes transmitted to the UE through RRC signaling, and each resource mapping configuration mode may include a corresponding mapping function and the range of the serial numbers of the VRBs.

The reception module is further configured to receive the quantity of scheduled RBs from the network side device, and select one resource mapping configuration mode from a plurality of resource mapping configuration modes in accordance with the quantity of the scheduled RBs. The plurality of resource mapping configuration modes may include a plurality of preconfigured resource mapping configuration modes or a plurality of resource mapping configuration modes transmitted to the UE through RRC signaling, each resource mapping configuration mode may include a corresponding mapping function and the range of the serial numbers of the VRBs, and each resource mapping configuration mode may correspond to one value of the quantity of the scheduled RBs.

The reception module is further configured to receive BWP configurations allocated for the UE from the network side device, and select one resource mapping configuration mode from a plurality of resource mapping configuration modes in accordance with the BWP configurations. The plurality of resource mapping configuration modes may include a plurality of preconfigured resource mapping configuration modes or a plurality of resource mapping configuration modes transmitted to the UE through RRC signaling, each resource mapping configuration mode may include a corresponding mapping function and the range of the serial numbers of the VRBs, and each resource mapping configuration mode may correspond to one BWP configuration.

The reception module is further configured to receive BWP configurations and resource allocation types allocated for the UE from the network side device, and select one resource mapping configuration mode from a plurality of resource mapping configuration modes in accordance with the BWP configurations and the resource allocation types. The plurality of resource mapping configuration modes may include a plurality of preconfigured resource mapping configuration modes or a plurality of resource mapping configuration modes transmitted to the UE through RRC signaling, and each resource mapping configuration mode may correspond to a combination of one BWP configuration and one resource allocation type.

The reception module is father configured to receive DCI carrying the resource mapping configuration information from the network side device, and select one resource mapping configuration mode from a plurality of resource mapping configuration modes in accordance with DCI formats. The plurality of resource mapping configuration modes may include a plurality of preconfigured resource mapping configuration modes or a plurality of resource mapping configuration modes transmitted to the UE through RRC signaling, and each resource mapping configuration mode may correspond to one DCI format.

The reception module is further configured to receive DCI carrying the resource mapping configuration information from the network side device, and select one resource mapping configuration mode from a plurality of resource mapping configuration modes in accordance with DCI formats. In the plurality of resource mapping configuration modes, a bandwidth to which VRBs map in a distributed manner may be a pre-allocated bandwidth or a bandwidth for an actually-scheduled resource. The pre-allocated bandwidth may be configured by the network side device or acquired in accordance with at least one of the quantity $N_{VRB}^{DL}$ of the VRBs available for the downlink bandwidth, the frequency gap of the adjacent VRBs after the adjacent VRBs have been mapped to the corresponding PRBs, the transmission bandwidth where the UE is located, and the bandwidth occupied by the scheduled data.

The reception module is further configured to acquire values of bandwidths for actually-scheduled resources from the network side device, and select one resource mapping configuration mode from a plurality of resource mapping configuration modes in accordance with the values of the bandwidths for the actually-scheduled resources. The plurality of resource mapping configuration modes may include a plurality of preconfigured resource mapping configuration modes or a plurality of resource mapping configuration modes transmitted to the UE through RRC signaling, and each resource mapping configuration mode may correspond to one value of the bandwidth.

Further, the resource mapping configuration information may be used to indicate that a bandwidth to which the resources map in a distributed manner is the pre-configured bandwidth or the bandwidth for the actually-scheduled resources when the UE receives a PDSCH carrying RMSI, a message 2, a message 4 and/or OSI in an initial access procedure.

The present disclosure further provides in some embodiments a network side device, including a memory, a processor, and a computer program stored in the memory and executed by the processor. The processor is configured to execute the computer program so as to implement the above-mentioned resource mapping method.

Figure 9:
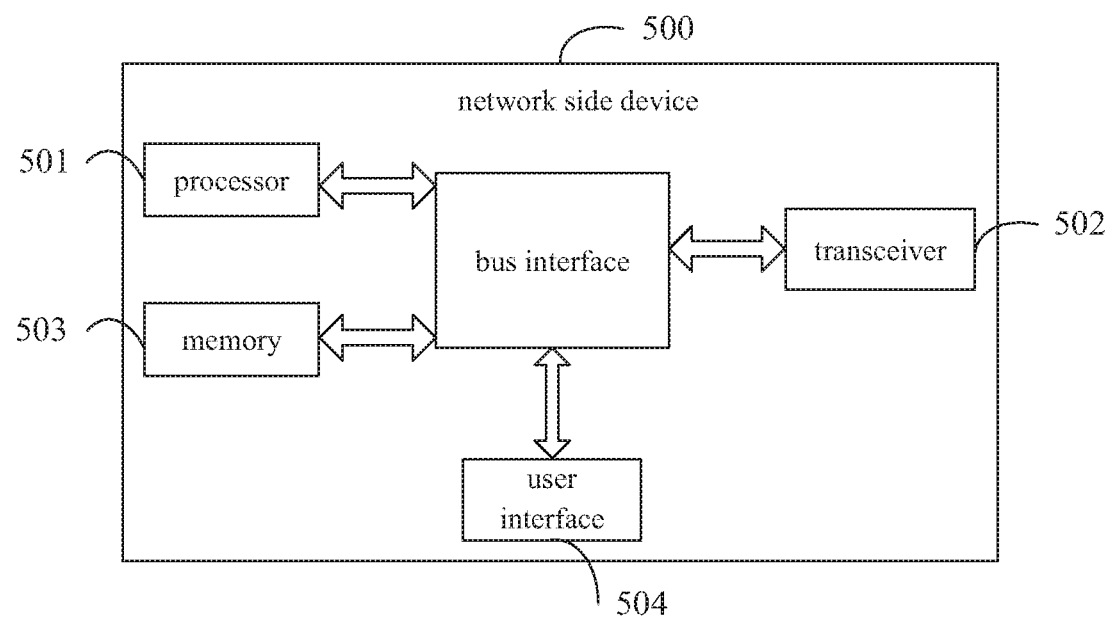
FIG. 9 is a schematic view showing the network side device according to one embodiment of the present disclosure.

The present disclosure further provides in some embodiments a network side device 500 capable of implementing the above-mentioned resource mapping method with a same technical effect. As shown in FIG. 9, the network side device 500 includes a processor 501, a transceiver 502, a memory 503, a user interface 504 and a bus interface.

In the embodiments of the present disclosure, the network side device 500 may further include a computer program stored in the memory 503 and executed by the processor 501. The processor 501 is configured to read the computer program so as to determine resource mapping configuration information about a PDCCH, map each VRB to a corresponding PRB in accordance with the resource mapping configuration information, and transmit the resource mapping configuration information to a UE, so as to enable the UE to acquire a bandwidth to which VRBs map in a distributed manner in accordance with one or more configuration parameters in the resource mapping configuration information. The one or more configuration parameters in the resource mapping configuration information may include at least one of the quantity $N_{VRB}^{DL}$ of the VRBs available for a downlink bandwidth, a frequency gap of PRBs to which adjacent VRBs map, a transmission bandwidth where the UE is located, and a bandwidth occupied by scheduled data.

In FIG. 9, bus architecture may include a number of buses and bridges connected to each other, so as to connect various circuits for one or more processors 501 and one or more memories 503. In addition, as is known in the art, the bus architecture may be used to connect any other circuits, such as a circuit for a peripheral device, a circuit for a voltage stabilizer and a power management circuit. The bus interface may be provided, and the transceiver 502 may consist of a plurality of elements, i.e., a transmitter and a receiver for communication with any other devices over a transmission medium. With respect to different UEs, the user interface 504 may also be provided for devices which are to be arranged inside or outside the UE, and these devices may include but not limited to a keypad, a display, a speaker, a microphone and a joystick. The processor 501 may take charge of managing the bus architecture as well as general processings. The memory 503 may store therein data for the operation of the processor 501.

In a possible embodiment of the present disclosure, the resource mapping configuration information may include mapping functions from serial numbers of the VRBs to serial numbers of the PRBs or serial numbers of the mapping functions, independent variables of each mapping function may at least include the serial numbers of the VRBs and serial numbers of slots, and the serial numbers of the VRBs may be within the range of 0 to $N_{VRB}^{DL}-1$.

In a possible embodiment of the present disclosure, the processor 501 is further configured to execute the computer program so as to transmit the resource mapping configuration information to the UE through RRC signaling, so as to enable the UE to select one resource mapping configuration mode from a plurality of resource mapping configuration modes. The plurality of resource mapping configuration modes may include a plurality of preconfigured resource mapping configuration modes or a plurality of resource mapping configuration modes transmitted to the UE in advance, and each resource mapping configuration triode may include a corresponding mapping function and the range of the serial numbers of the VRBs.

In a possible embodiment of the present disclosure, the processor 501 is farther configured to execute the computer program so as to transmit the resource mapping configuration information to the UE through L1 signaling, so as to enable the UE to select one resource mapping configuration mode from a plurality of resource mapping configuration modes. The plurality of resource mapping configuration modes may include a plurality of preconfigured resource mapping configuration modes or a plurality of resource mapping configuration modes transmitted to the UE through RRC signaling, and each resource mapping configuration mode may include a corresponding mapping function and the range of the serial numbers of the VRBs.

In a possible embodiment of the present disclosure, the processor 501 is further configured to execute the computer program so as to notify the quantity of scheduled RBs to the UE, so as to enable the UE to select one resource mapping configuration mode from a plurality of resource mapping configuration modes in accordance with the quantity of the scheduled RBs. The plurality of resource mapping configuration modes may include a plurality of preconfigured resource mapping configuration modes or a plurality of resource mapping configuration modes transmitted to the UE through RRC signaling, each resource mapping configuration mode may include a corresponding mapping function and the range of the serial numbers of the VRBs, and each resource mapping configuration mode may correspond to one value of the quantity of the scheduled RBs.

In a possible embodiment of the present disclosure, the processor 501 is further configured to execute the computer program so as to transmit BWP configurations allocated for the UE to the UE, so as to enable the UE to select one resource mapping configuration mode from a plurality of resource mapping configuration modes in accordance with the BWP configurations. The plurality of resource mapping configuration modes may include a plurality of preconfigured resource mapping configuration modes or a plurality of resource mapping configuration modes transmitted to the UE through RRC signaling, each resource mapping configuration mode may include a corresponding mapping function and the range of the serial numbers of the VRBs, and each resource mapping configuration mode may correspond to one BWP configuration.

In a possible embodiment of the present disclosure, the processor 501 is further configured to execute the computer program so as to transmit BWP configurations and resource allocation types allocated for the UE to the UE, so as to enable the UE to select one resource mapping configuration mode from a plurality of resource mapping configuration modes in accordance with the BWP configurations and the resource allocation types. The plurality of resource mapping configuration modes may include a plurality of preconfigured resource mapping configuration modes or a plurality of resource mapping configuration modes transmitted to the UE through RRC signaling, and each resource mapping configuration mode may correspond to a combination of one BWP configuration and one resource allocation type.

In a possible embodiment of the present disclosure, the processor 501 is further configured to execute the computer program so as to transmit the resource mapping configuration information to the UE through DCI, so as to enable the UE to select one resource mapping configuration mode from a plurality of resource mapping configuration modes in accordance with DCI formats. The plurality of resource mapping configuration modes may include a plurality of preconfigured resource mapping configuration modes or a plurality of resource mapping configuration modes transmitted to the UE through RRC signaling, and each resource mapping configuration mode may correspond to one DCI format.

In a possible embodiment of the present disclosure, the processor 501 is further configured to execute the computer program so as to transmit the resource mapping configuration information to the UE through DCI, so as to enable the UE to select one resource mapping configuration mode from a plurality of resource mapping configuration modes in accordance with DCI formats. In the plurality of resource mapping configuration modes, a bandwidth to which VRBs map in a distributed manner may be a pre-allocated bandwidth or a bandwidth for an actually-scheduled resource. The pre-allocated bandwidth may be configured by the network side device or acquired in accordance with at least one of the quantity $N_{VRB}^{DL}$ of the VRBs available for the downlink bandwidth, the frequency gap of the adjacent VRBs after the adjacent VRBs have been mapped to the corresponding PRBs, the transmission bandwidth where the UE is located, and the bandwidth occupied by the scheduled data.

In a possible embodiment of the present disclosure, the processor 501 is further configured to execute the computer program so as to notify values of bandwidths for actually-scheduled resources to the UE, so as to enable the UE to select one resource mapping configuration mode from a plurality of resource mapping configuration modes in accordance with the values of the bandwidths for the actually-scheduled resources. The plurality of resource mapping configuration modes may include a plurality of preconfigured resource mapping configuration modes or a plurality of resource mapping configuration modes transmitted to the UE through RRC signaling, and each resource mapping configuration mode may correspond to one value of the bandwidth.

In a possible embodiment of the present disclosure, the resource mapping configuration information may be used to indicate that a bandwidth to which the resources map in a distributed manner is the pre-configured bandwidth or the bandwidth for the actually-scheduled resources when the UE receives a PDSCH carrying RMSI, a message 2, a message 4 and/or OSI in an initial access procedure.

The present disclosure further provides in some embodiments a UE, including a memory, a processor, and a computer program stored in the memory and executed by the processor. The processor is configured to execute the computer program so as to implement the above-mentioned resource determination method.

Figure 10:
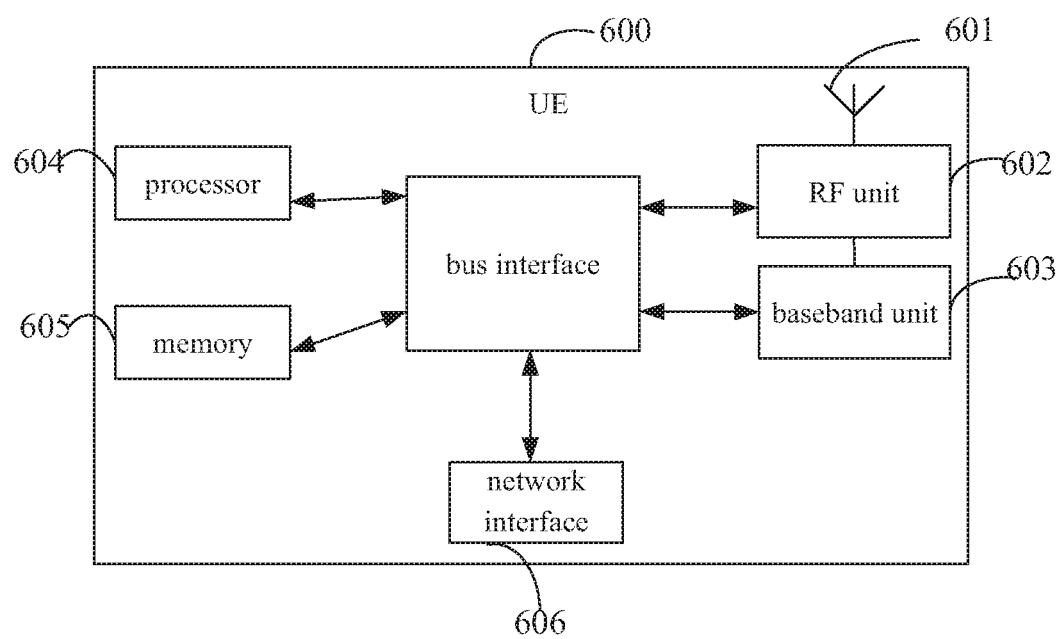
FIG. 10 is a schematic view showing the UE according to one embodiment of the present disclosure.

The present disclosure further provides in some embodiments a UE 600 capable of implementing the above-mentioned resource determination method with a same technical effect. As shown in FIG. 10, the UE 600 includes a processor 604, an antenna 601, a Radio Frequency (RF) unit 602, a baseband unit 603, a memory 605, a network interface 606 and a bus interface.

In the embodiments of the present disclosure, the UE 600 may further include a computer program stored in the memory 605 and executed by the processor 605. The processor 604 is configured to execute the computer program so as to: receive resource mapping configuration information about a PDCCH from a network side device; and determine a bandwidth to which VRBs map in a distributed manner in accordance with one or more configuration parameters in the resource mapping configuration information. The one or more configuration parameters in the resource mapping configuration information may include at least one of the quantity $N_{VRB}^{DL}$ of VRBs available for a downlink bandwidth, a frequency gap of PRBs to which adjacent VRBs map, a transmission bandwidth where the UE is located, and a bandwidth occupied by scheduled data.

In FIG. 10, bus architecture may include a number of buses and bridges connected to each other, so as to connect various circuits for one or more processors 604 and one or more memories 605. In addition, as is known in the art, the bus architecture may be used to connect any other circuits, such as a circuit for a peripheral device, a circuit for a voltage stabilizer and a power management circuit. The bus interface may be provided, and the network interface 606 may also be provided for devices which are to be arranged inside or outside the UE, and these devices may include but not limited to a keypad, a display, a speaker, a microphone and a joystick. The processor 604 may take charge of managing the bus architecture as well as general processings. The memory 605 may store therein data for the operation of the processor 601.

In a possible embodiment of the present disclosure, the processor 601 is further configured to execute the computer program so as to receive downlink data on the determined bandwidth.

In a possible embodiment of the present disclosure, the resource mapping configuration information may include mapping functions from serial numbers of the VRBs to serial numbers of the PRBs or serial numbers of the mapping functions, independent variables of each mapping function may at least include the serial numbers of the VRBs and serial numbers of slots, and the serial numbers of the VRBs may be within the range of 0 to $N_{VRB}^{DL}-1$.

In a possible embodiment of the present disclosure, the processor 604 is further configured to execute the computer program so as to receive RRC signaling carrying the resource mapping configuration information from the network side device, and the RRC signaling may be used to notify the UE to select one resource mapping configuration mode from a plurality of resource mapping configuration modes. The plurality of resource mapping configuration modes may include a plurality of preconfigured resource mapping configuration modes or a plurality of resource mapping configuration modes transmitted to the UE in advance, and each resource mapping configuration mode may include a corresponding mapping function and the range of the serial numbers of the VRBs.

In a possible embodiment of the present disclosure, the processor 604 is further configured to execute the computer program so as to receive L1 signaling carrying the resource mapping configuration information from the network side device, and the L1 signaling may be used to notify the UE to select one resource mapping configuration mode from a plurality of resource mapping configuration modes. The plurality of resource mapping configuration modes may include a plurality of preconfigured resource mapping configuration modes or a plurality of resource mapping configuration modes transmitted to the UE through RRC signaling, and each resource mapping configuration mode may include a corresponding mapping function and the range of the serial numbers of the VRBs.

In a possible embodiment of the present disclosure, the processor 604 is further configured to execute the computer program so as to receive the quantity of scheduled RBs from the network side device, and select one resource mapping configuration mode from a plurality of resource mapping configuration modes in accordance with the quantity of the scheduled RBs. The plurality of resource mapping configuration modes may include a plurality of preconfigured resource mapping configuration modes or a plurality of resource mapping configuration modes transmitted to the UE through RRC signaling, each resource mapping configuration mode may include a corresponding mapping function and the range of the serial numbers of the VRBs, and each resource mapping configuration mode may correspond to one value of the quantity of the scheduled RBs.

In a possible embodiment of the present disclosure, the processor 604 is further configured to execute the computer program so as to receive BWP configurations allocated for the UE from the network side device, and select one resource mapping configuration mode from a plurality of resource mapping configuration modes in accordance with the BWP configurations. The plurality of resource mapping configuration modes may include a plurality of preconfigured resource mapping configuration modes or a plurality of resource mapping configuration modes transmitted to the UE through RRC signaling, each resource mapping configuration mode may include a corresponding mapping function and the range of the serial numbers of the VRBs, and each resource mapping configuration mode may correspond to one BWP configuration.

In a possible embodiment of the present disclosure, the processor 604 is further configured to execute the computer program so as to receive BWP configurations and resource allocation types allocated for the UE from the network side device, and select one resource mapping configuration mode from a plurality of resource mapping configuration modes in accordance with the BWP configurations and the resource allocation types. The plurality of resource mapping configuration modes may include a plurality of preconfigured resource mapping configuration modes or a plurality of resource mapping configuration modes transmitted to the UE through RRC signaling, and each resource mapping configuration mode may correspond to a combination of one BWP configuration and one resource allocation type.

In a possible embodiment of the present disclosure, the processor 601 is further configured to execute the computer program so as to receive DCI carrying the resource mapping configuration information from the network side device, and select one resource mapping configuration mode from a plurality of resource mapping configuration modes in accordance with DCI formats. The plurality of resource mapping configuration modes may include a plurality of preconfigured resource mapping configuration modes or a plurality of resource mapping configuration modes transmitted to the UE through RRC signaling, and each resource mapping configuration mode may correspond to one DCI format.

In a possible embodiment of the present disclosure, the processor 604 is further configured to execute the computer program so as to receive DCI carrying the resource mapping configuration information from the network side device, and select one resource mapping configuration mode from a plurality of resource mapping configuration modes in accordance with DCI formats. In the plurality of resource mapping configuration modes, a bandwidth to which VRBs map in a distributed manner may be a pre-allocated bandwidth or a bandwidth for an actually-scheduled resource. The pre-allocated bandwidth may be configured by the network side device or acquired in accordance with at least one of the quantity $N_{VRB}^{DL}$ of the VRBs available for the downlink bandwidth, the frequency gap of the adjacent VRBs after the adjacent VRBs have been mapped to the corresponding PRBs, the transmission bandwidth where the UE is located, and the bandwidth occupied by the scheduled data.

In a possible embodiment of the present disclosure, the processor 604 is further configured to execute the computer program so as to acquire values of bandwidths for actually-scheduled resources from the network side device, and select one resource mapping configuration mode from a plurality of resource mapping configuration modes in accordance with the values of the bandwidths for the actually-scheduled resources. The plurality of resource mapping configuration modes may include a plurality of preconfigured resource mapping configuration modes or a plurality of resource mapping configuration modes transmitted to the UE through RRC signaling, and each resource mapping configuration mode may correspond to one value of the bandwidth.

In a possible embodiment of the present disclosure, the resource mapping configuration information may be used to indicate that a bandwidth to which the resources map in a distributed manner the pre-configured bandwidth or the bandwidth for the actually-scheduled resources when the UE receives a PDSCH carrying RMSI, a message 2, a message 4 and/or OSI in an initial access procedure.

The present disclosure further provides in some embodiments a computer-readable storage medium storing therein a computer program. The computer program is executed by a processor so as to implement the above-mentioned resource mapping method or the above-mentioned resource determination method.

It should be appreciated that, the embodiments of the present disclosure may be implemented by hardware, software, firmware, middleware, microcode or a combination thereof. For the hardware implementation, the processor may include one or more of an ASIC, a DSP, a DSP device (DSPD), a Programmable Logic Device (PLD), an FPGA, a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., procedures or functions). Software codes may be stored in the memory and executed by the processor. The memory may be implemented inside or outside the processor.

The above embodiments have been described in a progressive manner, and the same or similar contents in the embodiments will not be repeated, i.e., each embodiment merely focuses on the difference from the others.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc-Read Only Memory (CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although the preferred embodiments are described above, a person skilled in the art may make modifications and alterations to these embodiments in accordance with the basic concept of the present disclosure. So, the attached claims are intended to include the preferred embodiments and all of the modifications and alterations that fall within the scope of the present disclosure.

It should be further appreciated that, such words as "first" and "second" are merely used to separate one entity or operation from another entity or operation, but are not necessarily used to represent or imply any relation or order between the entities or operations. In addition, such terms as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A resource mapping method performed by a network side device, the resource mapping method comprising:
   determining resource mapping configuration information about a Physical Downlink Control Channel (PDCCH); and
   mapping each Virtual Resource Block (VRB) to a corresponding Physical Resource Block (PRB) in accordance with the resource mapping configuration information, and transmitting the resource mapping configuration information to a User Equipment (UE) through L1 signaling, so as to enable the UE to select one resource mapping configuration mode from a plurality of resource mapping configuration modes, wherein the plurality of resource mapping configuration modes comprises a plurality of preconfigured resource mapping configuration modes or a plurality of resource mapping configuration modes transmitted to the UE through Radio Resource Control (RRC) signaling,
   wherein the resource mapping configuration information comprises mapping functions from serial numbers of the VRBs to serial numbers of the PRBs or serial numbers of the mapping functions, independent variables of each mapping function at least comprise the serial numbers of the VRBs and serial numbers of slots, and the serial numbers of the VRBs are within the range of 0 to $N_{VRB}^{DL}-1$, where $N_{VRB}^{DL}$ represents a quantity of the VRBs available for a downlink bandwidth.

2. The resource mapping method according to claim 1, wherein the transmitting the resource mapping configuration information to the UE through L1 signaling comprises:
   transmitting the L1 signaling carrying BWP configurations and resource allocation types allocated for the UE to the UE, so as to enable the UE to select one resource mapping configuration mode from a plurality of resource mapping configuration modes in accordance with the BWP configurations and the resource allocation types,
   wherein each resource mapping configuration mode corresponds to a combination of one BWP configuration and one resource allocation type.

3. The resource mapping method according to claim 1, wherein the transmitting the resource mapping configuration information to the UE through L1 signaling comprises:
   transmitting the L1 signaling carrying the resource mapping configuration information to the UE through Downlink Control Information (DCI), so as to enable the UE to select one resource mapping configuration mode from a plurality of resource mapping configuration modes in accordance with DCI formats,
   wherein each resource mapping configuration mode corresponds to one DCI format.

4. The resource mapping method according to claim 1, wherein the transmitting the resource mapping configuration information to the UE through L1 signaling comprises:
   transmitting the L1 signaling carrying the resource mapping configuration information to the UE through DCI, so as to enable the UE to select one resource mapping configuration mode from a plurality of resource mapping configuration modes in accordance with DCI formats,
   wherein in the plurality of resource mapping configuration modes, a bandwidth to which VRBs map in a distributed manner is a pre-allocated bandwidth or a bandwidth for an actually-scheduled resource, the pre-allocated bandwidth is configured by the network side device or acquired in accordance with at least one of the quantity $N_{VRB}^{DL}$ of the VRBs available for the downlink bandwidth, the frequency gap of the adjacent VRBs after the adjacent VRBs have been mapped to the corresponding PRBs, the transmission bandwidth where the UE is located, or the bandwidth occupied by the scheduled data, where $N_{VRB}^{DL}$ represents a quantity of the VRBs available for a downlink bandwidth.

5. The resource mapping method according to claim 1, wherein the transmitting the resource mapping configuration information to the UE through L1 signaling comprises:
   transmitting the L1 signaling carrying values of bandwidths for actually-scheduled resources to the UE, so as to enable the UE to select one resource mapping configuration mode from a plurality of resource mapping configuration modes in accordance with the values of the bandwidths for the actually-scheduled resources,
   wherein each resource mapping configuration mode corresponds to one value of the bandwidth,
   wherein the resource mapping configuration information is used to indicate that a bandwidth to which the resources map in a distributed manner is the preconfigured bandwidth or the bandwidth for the actually-scheduled resources when the UE receives a Physical Downlink Shared Channel (PDSCH) carrying Remaining System Information (RMSI), a message 2, a message 4 and/or Other System Information (OSI) in an initial access procedure.

6. The resource mapping method according to claim 1, wherein one or more configuration parameters in the resource mapping configuration information comprise at least one of:
   the quantity $N_{VRB}^{DL}$ of the VRBs available for a downlink bandwidth, a frequency gap of PRBs to which adjacent VRBs map, a transmission bandwidth where the UE is located, a bandwidth occupied by scheduled data, or interleaving granularity $N_{unit}$ of the block interleaver.

7. The resource mapping method according to claim 1, wherein serial numbers of consecutive VRBs are mapped to serial numbers of non-consecutive PRBs.

8. The resource mapping method according to claim 6, wherein serial numbers of consecutive VRBs are mapped to serial numbers of non-consecutive PRBs.

9. A resource determination method performed by a User Equipment (UE), the resource determination method comprising:
   receiving L1 signaling carrying resource mapping configuration information from a network side device, wherein the L1 signaling is used to notify the UE to select one resource mapping configuration mode from a plurality of resource mapping configuration modes, wherein the plurality of resource mapping configuration modes comprises a plurality of preconfigured resource mapping configuration modes or a plurality of resource mapping configuration modes transmitted to the UE through Radio Resource Control (RRC) signaling; and
   determining a bandwidth to which resources map in a distributed manner in accordance with one or more configuration parameters in the resource mapping configuration information,
   wherein the resource mapping configuration information comprises mapping functions from serial numbers of the VRBs to serial numbers of the PRBs or serial numbers of the mapping functions, independent variables of each mapping function at least comprise the serial numbers of the VRBs and serial numbers of slots, and the serial numbers of the VRBs are within the range of 0 to $N_{VRB}^{DL}-1$, where $N_{VRB}^{DL}$ represents a quantity of the VRBs available for a downlink bandwidth.

10. The resource determination method according to claim 9,
wherein the resource determination method further comprises:
subsequent to determining the bandwidth to which the resources map in a distributed manner in accordance with the one or more configuration parameters in the resource mapping configuration information, receiving downlink data on the determined bandwidth.

11. The resource determination method according to claim 9, wherein the receiving L1 signaling carrying the resource mapping configuration information from the network side device comprises:
receiving the L1 signaling carrying BWP configurations and resource allocation types allocated for the UE from the network side device, and selecting one resource mapping configuration mode from a plurality of resource mapping configuration modes in accordance with the BWP configurations and the resource allocation types, wherein each resource mapping configuration mode corresponds to a combination of one BWP configuration and one resource allocation type; or
receiving the L1 signaling carrying the resource mapping configuration information from the network side device, and selecting one resource mapping configuration mode from a plurality of resource mapping configuration modes in accordance with L1 signaling formats, wherein and each resource mapping configuration mode corresponds to one L1 signaling format; or
receiving the L1 signaling carrying the resource mapping configuration information from the network side device, and selecting one resource mapping configuration mode from a plurality of resource mapping configuration modes in accordance with L1 signaling formats, wherein in the plurality of resource mapping configuration modes, a bandwidth to which VRBs map in a distributed manner is a pre-allocated bandwidth or a bandwidth for an actually-scheduled resource, and the pre-allocated bandwidth is configured by the network side device or acquired in accordance with at least one of the quantity $N_{VRB}^{DL}$ of the VRBs available for the downlink bandwidth, the frequency gap of the adjacent VRBs after the adjacent VRBs have been mapped to the corresponding PRBs, the transmission bandwidth where the UE is located, or the bandwidth occupied by the scheduled data, where $N_{VRB}^{DL}$ represents a quantity of the VRBs available for a downlink bandwidth.

12. The resource determination method according to claim 9, wherein the receiving L1 signaling carrying the resource mapping configuration information from the network side device comprises:
acquiring the L1 signaling carrying values of bandwidths for actually-scheduled resources from the network side device, and selecting one resource mapping configuration mode from a plurality of resource mapping configuration modes in accordance with the values of the bandwidths for the actually-scheduled resources,
wherein each resource mapping configuration mode corresponds to one value of the bandwidth; and
wherein the resource mapping configuration information is used to indicate that a bandwidth to which the resources map in a distributed manner is the pre-configured bandwidth or the bandwidth for the actu-ally-scheduled resources when the UE receives a PDSCH carrying RMSI, a message 2, a message 4 and/or OSI in an initial access procedure.

13. The resource determination method according to claim 9, wherein the one or more configuration parameters in the resource mapping configuration information further comprise interleaving granularity $N_{unit}$ of the block interleaver.

14. The resource determination method according to claim 13, wherein serial numbers of consecutive VRBs are mapped to serial numbers of non-consecutive PRBs.

15. A User Equipment (UE), comprising a memory, a processor, and a computer program stored in the memory and executed by the processor, wherein the processor is configured to execute the computer program so as to implement the resource determination method according to claim 9.

16. A network side device, comprising a memory, a processor, and a computer program stored in the memory and executed by the processor, wherein the processor is configured to execute the computer program so as to implement a resource mapping method performed by the network side device, the resource mapping method comprising:
determining resource mapping configuration information about a Physical Downlink Control Channel (PDCCH); and
mapping each Virtual Resource Block (VRB) to a corresponding Physical Resource Block (PRB) in accordance with the resource mapping configuration information, and transmitting the resource mapping configuration information to a User Equipment (UE) through L1 signaling, so as to enable the UE to select one resource mapping configuration mode from a plurality of resource mapping configuration modes, wherein the plurality of resource mapping configuration modes comprises a plurality of preconfigured resource mapping configuration modes or a plurality of resource mapping configuration modes transmitted to the UE through Radio Resource Control (RRC) signaling,
wherein the resource mapping configuration information comprises mapping functions from serial numbers of the VRBs to serial numbers of the PRBs or serial numbers of the mapping functions, independent variables of each mapping function at least comprise the serial numbers of the VRBs and serial numbers of slots, and the serial numbers of the VRBs are within the range of 0 to $N_{VRB}^{DL}-1$, where $N_{VRB}^{DL}$ represents a quantity of the VRBs available for a downlink bandwidth.

17. The network side device according to claim 16, wherein the transmitting the resource mapping configuration information to a User Equipment (UE) through L1 signaling comprises:
transmitting the L1 signaling carrying BWP configurations and resource allocation types allocated for the UE to the UE, so as to enable the UE to select one resource mapping configuration mode from a plurality of resource mapping configuration modes in accordance with the BWP configurations and the resource allocation types,
wherein each resource mapping configuration mode corresponds to a combination of one BWP configuration and one resource allocation type.

18. The network side device according to claim 16, wherein the transmitting the resource mapping configuration information to the UE through L1 signaling comprises:

transmitting the L1 signaling carrying the resource mapping configuration information to the UE through Downlink Control Information (DCI), so as to enable the UE to select one resource mapping configuration mode from a plurality of resource mapping configuration modes in accordance with DCI formats, wherein each resource mapping configuration mode corresponds to one DCI format.

19. The network side device according to claim 16, wherein the transmitting the resource mapping configuration information to the UE through L1 signaling comprises:

transmitting the L1 signaling carrying the resource mapping configuration information to the UE through DCI, so as to enable the UE to select one resource mapping configuration mode from a plurality of resource mapping configuration modes in accordance with DCI formats, wherein in the plurality of resource mapping configuration modes, a bandwidth to which VRBs map in a distributed manner is a pre-allocated bandwidth or a bandwidth for an actually-scheduled resource, the pre-allocated bandwidth is configured by the network side device or acquired in accordance with at least one of the quantity $N_{VRB}^{DL}$ of the VRBs available for the downlink bandwidth, the frequency gap of the adjacent VRBs after the adjacent VRBs have been mapped to the corresponding PRBs, the transmission bandwidth where the UE is located, or the bandwidth occupied by the scheduled data, wherein one or more configuration parameters in the resource mapping configuration information further comprise at least one of:

the quantity $N_{VRB}^{DL}$ of the VRBs available for a downlink bandwidth, a frequency gap of PRBs to which adjacent VRBs map, a transmission bandwidth where the UE is located, a bandwidth occupied by scheduled data, or interleaving granularity $N_{unit}$ of the block interleaver.

20. The network side device according to claim 16, wherein serial numbers of consecutive VRBs are mapped to serial numbers of non-consecutive PRBs.

* * * * *